(12) United States Patent
Hannuksela

(10) Patent No.: US 7,864,805 B2
(45) Date of Patent: *Jan. 4, 2011

(54) BUFFERING IN STREAMING DELIVERY

(75) Inventor: Miska Hannuksela, Ruutana (FI)

(73) Assignee: Nokia Corporation, Espoo (FI)

( * ) Notice: Subject to any disclaimer, the term of this patent is extended or adjusted under 35 U.S.C. 154(b) by 454 days.

This patent is subject to a terminal disclaimer.

(21) Appl. No.: 11/400,748

(22) Filed: Apr. 6, 2006

(65) Prior Publication Data

US 2006/0253600 A1 Nov. 9, 2006

Related U.S. Application Data

(60) Provisional application No. 60/669,580, filed on Apr. 7, 2005.

(51) Int. Cl.
*H04J 3/24* (2006.01)

(52) U.S. Cl. .................. 370/473; 370/487; 709/231; 714/776

(58) Field of Classification Search ............... 370/473, 370/487
See application file for complete search history.

(56) References Cited

U.S. PATENT DOCUMENTS

| 5,461,420 | A | * | 10/1995 | Yonemitsu et al. | ...... 375/240.15 |
|---|---|---|---|---|---|
| 5,619,337 | A | * | 4/1997 | Naimpally | ............ 386/83 |
| 6,700,893 | B1 | | 3/2004 | Radha et al. | |
| 2001/0007568 | A1 | * | 7/2001 | Morris | ............ 370/473 |
| 2002/0105951 | A1 | | 8/2002 | Hannuksela et al. | |
| 2002/0136310 | A1 | | 9/2002 | Saunders et al. | |
| 2004/0179619 | A1 | | 9/2004 | Tian et al. | |
| 2004/0190606 | A1 | | 9/2004 | Deshpande | |

(Continued)

FOREIGN PATENT DOCUMENTS

EP 0 768 768 4/1997

(Continued)

OTHER PUBLICATIONS

ETSI ("ETSI EN 301 192 v1.4.1, Digital Video Broadcasting (DVB); DVB specification for data broadcasting," Nov. 2004, ETSI.*

(Continued)

*Primary Examiner*—Daniel J Ryman
*Assistant Examiner*—Jae Y Lee

(57) ABSTRACT

Buffering packets of a media stream for transmission from a transmitting device to a receiving device. Media packets are formed from at least one kind of media information in a stream generator; at least one transmission frame is generated on the basis of media packets to be transmitted; packets to be transmitted are formed from the at least one transmission frame; and a transmission schedule is generated for packets to be transmitted. In addition, a first step and a second step of hypothetical decoding are also performed. The first step of hypothetical decoding is performed according to the transmission schedule and comprises buffering the packets to be transmitted according to the transmission schedule to a first hypothetical decoding buffer; and outputting packets from the first hypothetical decoding buffer on a transmission frame basis. The second step of hypothetical decoding comprises controlling the buffer occupancy level of the first hypothetical decoding buffer and the second hypothetical decoding buffer by controlling at least one of the following: the operation of the stream generator; the generation of at least one transmission frame; the transmission schedule.

17 Claims, 6 Drawing Sheets

U.S. PATENT DOCUMENTS

| | | | |
|---|---|---|---|
| 2004/0218669 | A1 | 11/2004 | Hannuksela |
| 2004/0218816 | A1 | 11/2004 | Hannuksela |
| 2004/0223551 | A1 | 11/2004 | Hannuksela |
| 2004/0228413 | A1 | 11/2004 | Hannuksela |
| 2005/0201471 | A1 | 9/2005 | Hannuksela |
| 2005/0254575 | A1 | 11/2005 | Hannuksela et al. |
| 2006/0072597 | A1 | 4/2006 | Hannuksela |
| 2006/0107187 | A1* | 5/2006 | Hannuksela ............... 714/776 |
| 2007/0186133 | A1* | 8/2007 | Stare ......................... 714/746 |

FOREIGN PATENT DOCUMENTS

| | | |
|---|---|---|
| WO | 01/37571 | 5/2001 |
| WO | 01/37571 A1 | 5/2001 |
| WO | 2004088988 A1 | 10/2004 |
| WO | 2005/027489 A2 | 3/2005 |
| WO | 2006053947 A1 | 5/2006 |

OTHER PUBLICATIONS

3GPP TS 26.234 V6.3.0 (Mar. 2005), Transparent end-to-end Packet-switched Streaming Service (PSS); Protocols and codecs (Release 6).

3GPP TS 26.346 V6.0.0 (Mar. 2005), Multimedia Broadcast/Multicast Service (MBMS); Protocols and codecs (Release 6).

ETSI EN 301 192 V1.4.1 (Nov. 2004), Digital Video Broadcasting (DVB); DVB specification for data broadcasting, pp. 1-5 and 71-78.

IETF RFC 3611, "RTP Control Protocol Extended Reports (RTCP XR)," Friedman et al, Nov. 2003.

IETF RFC 3640, "RTP Payload Format for Transport of MPEG-4 Elementary Streams," van der Meer et al, Nov. 2003.

IETF RFC 3984, "RTP Payload Format for H.264 Video," Wenger et al, Feb. 2005.

3GPP TS 26.346 V2.2.0 (Mar. 2005), Multimedia Broadcast/Multicast Service (MBMS), Protocols and codecs, Chapter 8.

Russian Office Action dated Jun. 20, 2008 issued in corresponding Russian Patent Application No. 2007140542/09 (044374), 6 pages.

English Translation of Russian Office Action dated Jun. 20, 2008 issued in corresponding Russian Patent Application No. 2007140542/09 (044374), 5 pages.

Russian Patent Application No. 2007140542 English Translation of Office Action—3 pages.

Joint Video Team (JVT) of ISO/IEC MPEG & ITU-T VCEG, "Study of Final Committee Draft of Joint Video Specification" JVT-F100, $6^{th}$ Meeting: Awaji, Island, JP, Dec. 5-13, 2002, pp. i-xiv and 1-208.

Joint Video Team (JVT) of ISO/IEC MPEG & ITU-T VCEG, "Video Complexity Verifier for HRD" JVT-B050, $2^{nd}$ Meeting: Geneva, CH, 29.01-01.02.2002, pp. 1-18.

Wiegand et al., "Draft ITU-T Recommendation and Final Draft International Standard of Joint Video Specification (ITU-T Rec. H.264 | ISO/IEC 14496-10 AVC)," Approved Output Document of JVT [Geneva May 27, 2003], 269 pages, including Annex C, pp. 207 to 217.

TSG-SA WG4: "3GPP TS 26.346 version 2.0.0 (Mar. 2005), Multimedia Broadcast/Multicast Service; Protocols and Codecs (Release 6)" Mar. 7, 2005, 3GPP DRAFT; SP-050082, 3rd Generation Partnership Project (3GPP), Mobile Competence Centre; 650, Route Des Lucioles; F-06921 Sophia-Antipolis Cedex; France, XP050204306 [retrieved on Mar. 7, 2005], 78 pages including Chapter 8, pp. 36 to 50.

EPO: extended European search report, Application No. 06725903.6-2223/1867079 PCT/FI2006050128, Nov. 11, 2009, 10 pages.

* cited by examiner

ADT + Padding = 191
RSDT + Puncturing = 64
Rows = {256, 512, 768, 1024}

BUFFERING IN STREAMING DELIVERY

CROSS-REFERENCE TO RELATED APPLICATION

This application claims priority from U.S. Provisional Patent Application No. 60/669,580 filed Apr. 7, 2005.

FIELD OF THE INVENTION

The invention relates to buffering packets of a media stream for transmission from a transmitting device to a receiving device. The invention also relates to a system, a transmitting device, a receiving device, a server, a wireless communication device, a signal, a gateway device, and a computer program product.

BACKGROUND OF THE INVENTION

Transmission of media information such as audio signal, video signals, still images etc. is typically based on packetization i.e. information to be transmitted is framed into packets. The packets are then transmitted as one or more packet streams. The packet streams can be transmitted e.g. as RTP (Real Time Protocol) packets or as packets of an other protocol which are not necessarily RTP packets. It may happen that some of the packets get lost for some reason during the transmission. For example, the transmission channel may be affected by disturbances which may weaken the signals which carry the packet stream and cause losses to the packet stream. In the transmission stage it is possible to add some error recovery information to the packet stream which can be used at the receiving stage to recover lost packets. One known method is based on forward error correction (FEC) in which extra packets carrying error recovery information are inserted to the packet stream. Such extra packets are called as repair packets in this description i.e. packets carrying error recovery information. The repair packets are formed on the basis of those packets which should be protected by the repair packets. For example, a bitwise XOR operation is performed on data of the packets and the calculated FEC values are packetized to form the repair packets. The repair packets and the packets which are used in forming the repair packets form an FEC block. Therefore, the packet losses of any packets included in an FEC block may be recoverable by using the information of the repair packets of the same FEC block.

The packetization can also be applied on different layers of the so called protocol stacks. The well-known OSI model describes a seven-layer structure, in which the physical layer is at the bottom and the application layer is at the top of the protocol stack. The other layers of the OSI model are data link layer above the physical layer, network layer, transport layer, session layer, and presentation layer below the application layer. The RTP packets can be regarded as packets of the application layer (which, hence, can be called as an "RTP layer" in this case).

Many video communication systems provide controlling means for data transmission rate and buffering. In one-to-one systems, the recipient can send its buffer occupancy status to the originator, which can then tune the transmission rate accordingly (e.g. rate adaptation in 3GPP packet-switched streaming). In unidirectional systems, transmitted streams typically have to comply with a known buffering model of the receiver. Examples of buffering systems including specified recipient buffering models include MPEG-2 Systems, Annex G of 3GPP packet-switched streaming (3GPP Technical Specification 26.234), and 3GPP multimedia broadcast/multicast system (MBMS, 3GPP Technical Specification 26.346). Senders have to ensure that the transmitted streams comply with the buffering model, i.e. do not cause underflows or overflows of the buffer. Receivers should be capable of receiving valid streams and can use the buffer size of the hypothetical buffer model for allocation of the actual buffer.

A simplified system for IP datacasting over DVB-H is described in FIG. 2 as a block diagram. Content servers provide multimedia content over IP network to IP encapsulators. IP encapsulator encapsulates the IP streams on top of MPEG-2 transport streams, which are conveyed over a DVB-H network to receiving terminals.

In FIG. 7 an example of media transmission in a DVB network 701 is depicted. In DVB systems, a multiplex 702 is a set of DVB services 703 multiplexed together and carried on one transport stream. Transport streams of different multiplexes 702 can be transmitted in the DVB network 701. The components of a DVB service (e.g. video component, audio component, text component) are included as elementary streams 704 each carrying data of one of the components of one of the DVB services 703. The components of the DVB services may be encapsulated as IP (Internet Protocol) streams 705 containing IP datagrams.

For DVB systems, the so called multiprotocol encapsulation (MPE) has been introduced. The MPE is intended for encoding network layer (OSI-model layer 3) datagrams (IP packets) into transport streams. Each IP datagram is typically encoded into a single MPE section. Single elementary stream may contain multiple MPE section streams. An elementary stream carrying MPE section may also carry error correction data i.e. MPE FEC sections for supporting error correction for data packets on MPE section payloads. MPE sections can be regarded as packets of the data link layer of the OSI protocol stack Hypothetical reference decoder (HRD) in some video coding standards is used to verify that produced bitstreams are standard-compliant and that decoders produce standard-compliant output. Standard-compliant decoders are required to be capable of inputting streams that are compliant to the HRD. The HRD is used to prevent "adverse" bitstreams, i.e. it constraints the resource consumption in the decoders, both in terms of memory usage and computational complexity. The input to the HRD is constant bitrate or a piecewise function of 0 and constant bitrate. The HRD is also used to allow video bitrate fluctuation, which enables achieving of nearly constant picture rate and quality.

When the media streams are sent in a multiplexed manner, the output of the hypothetical demultiplexer must be compatible with the input requirements for the hypothetical media decoder. Otherwise, compatibility to the media decoder buffer model cannot be guaranteed.

FEC decoding of an MPE FEC frame requires initial buffering (from the reception of the first packet for the MPE FEC frame until the start of media decoding) in the receiving terminal, because if the receiver started to decode source RTP packets (i.e. media RTP packets) immediately when the first one is received, any lost source RTP packet would cause a delay in decoding until the repair columns of the MPE FEC frame are received. This would consequently cause a pause in the playback.

Furthermore, as explained in the following, pause less playback may require additional initial buffering beyond the reception of the first MPE FEC frame. Let $t_{ai}(n)$ be the reception time of the first bit of an MPE FEC frame of index n in transmission order, and let $t_{af}(n)$ be the reception time of the last bit of the MPE FEC frame. Furthermore, let b(n) be the number of bits in the RTP payloads of a media stream within MPE FEC frame n, and r(n) be the bitrate of the media stream (that is used for verification of HRD compliancy). If, for all values of n, $b(n)/r(n)=t_{af}(n+1)-t_{af}(n)$, then initial buffering duration would be always 0. However, this is will not be the case due to some of the following reasons:

First, puncturing (number of "media" columns per MPE FEC frame), FEC code rate (number of FEC columns per MPE FEC frame), and amount of padding may vary.

Second, scheduling of time-slicing bursts may not be as accurate as required in the formula above, but it is likely to follow average bitrates of the stream and the time-slicing burst interval derived from the average bitrate.

Third, an elementary stream and a time slice may contain packets from multiple IP streams. Meeting an accurate bit budget for each IP stream within a time slice is a challenging target for varying-bitrate media such as video.

As a summary, initial buffering of one MPE FEC frame entirely is not a sufficient condition to guarantee pauseless decoding and playback. Therefore, senders must give receivers information that allows sufficient but not exhaustive amount of initial buffering.

Clause 13 of ETSI EN 301 192 v1.4.1 specifies the decoder model for DVB data broadcasting. The model consists of a transport buffer and an optional main buffer. The transport buffer is a small (512-byte) buffer to remove duplicates of MPEG-2 TS packets. The main buffer is used to smooth the bitrate to be suitable for media decoders. The operation of the main buffer can be controlled by specifying the output byte rate in the smoothing_buffer_descriptor syntax structure of MPEG-2 systems. However, there is no mechanism to signal and apply an initial buffering delay in the main buffer, and therefore the main buffer is unsuitable to be used in combination with MPE FEC decoding.

As the DVB-H IP datacasting is a multicast/broadcast service, new receivers may "tune in" in the middle of the stream i.e. new receivers may begin to receive the stream later than the first packet of the stream was transmitted. The optimal (minimum) initial buffering delay is usually not constant throughout the stream.

Size of FEC Decoding Buffer

As was shown above, received packets for an MPE FEC frame have to be buffered before the decoding of the FEC packets can be started. Such a buffer is called as an FEC decoding buffer in this description. The buffer occupancy level of the FEC decoding buffer depends inter alia on 1) the transmission schedule of the elementary stream, 2) the amount of initial buffering before starting the emptying of the buffer, 3) the method of building an FEC matrix inside the FEC decoding buffer, and 4) the output rate of data from the FEC decoding buffer. The maximum buffer occupancy level determines the required buffer size for the stream. It is evident that in different receiving device implementations the FEC decoding and the related buffering may be implemented differently compared to each other. For example, players may have a different approach for output rate handling—one device may push data out from the FEC decoding buffer as soon as the buffers "downstream" (e.g. decoder input buffers) allow, and another device may pull data out from the FEC decoding buffer just on time when the next piece of data is needed for decoding. Therefore, the maximum buffer occupancy level may vary in different implementations, and consequently it would be problematic to determine the required FEC decoding buffer size of a particular stream without a hypothetical buffer model.

Encoders and transmitters should also be aware of the supported FEC decoding buffer size of all receivers when performing FEC encoding and transmission scheduling.

SUMMARY OF THE INVENTION

The present invention implements a hypothetical decoder buffering model in the media streaming. The model can be used to determine a minimum requirement for receivers/decoders to be able to process at least all the streams that the hypothetical model is capable of processing. Encoders and transmitters use the hypothetical decoder buffering model to verify that the transmitted stream does not cause overflows or underflows in the hypothetical decoding buffer.

The buffering model presented in this application contains two buffers, one for decapsulation of the MPE-FEC frames and virtual FEC decoding and another one to smooth out the data rate variations caused by bursty output of FEC decoding.

According to a first aspect of the present invention there is provided a method for buffering packets of a media stream comprising:
  forming media packets from at least one kind of media information in a stream generator;
  generating at least one transmission frame on the basis of media packets to be transmitted;
  forming packets to be transmitted from the at least one transmission frame;
  generating a transmission schedule for packets to be transmitted; and
  performing a first step of hypothetical decoding according to the transmission schedule comprising
    buffering the packets to be transmitted according to the transmission schedule to a a first hypothetical decoding buffer; and
    outputting packets from the first hypothetical decoding buffer on a transmission frame basis;
  performing a second step of hypothetical decoding comprising:
    buffering packets formed on the basis of the output from the first hypothetical decoding buffer;
  controlling the buffer occupancy level of the first hypothetical decoding buffer and the second hypothetical decoding buffer by controlling at least one of the following:
    the operation of the stream generator;
    the generation of at least one transmission frame;
    the transmission schedule.

According to a second aspect of the present invention there is provided a system for buffering a media stream for transmission from a transmitting device to a receiving device, the transmitting device comprising:
  a stream generator comprising
    a first packetizer for forming media packets from at least one kind of media information of the media stream;
    a frame generator for generating at least one transmission frame on the basis of media packets to be transmitted;
    a second packetizer for forming packets to be transmitted from the at least one transmission frame; and
    a scheduler for generating a transmission schedule for packets to be transmitted; and
  a hypothetical decoder for performing hypothetical decoding during the transmission according to the transmission schedule comprising
    a first hypothetical decoding buffer for buffering the packets to be transmitted according to the transmission schedule; and an output for outputting packets from the first hypothetical decoding buffer on a transmission frame basis;
a second hypothetical buffer for buffering packets formed on the basis of the output from the first hypothetical decoding buffer; and
a controller for controlling the buffer occupancy level of the first hypothetical decoding buffer and the second hypothetical decoding buffer by controlling at least one of the following:
the operation of the stream generator;
the generation of at least one transmission frame;
the transmission schedule.

According to a third aspect of the present invention there is provided a transmitting device comprising a buffer for buffering a media stream for transmission from the transmitting device to a receiving device, the transmitting device further comprising:
a stream generator comprising
a first packetizer for forming media packets from at least one kind of media information of the media stream;
a frame generator for generating at least one transmission frame on the basis of media packets to be transmitted;
a second packetizer for forming packets to be transmitted from the at least one transmission frame; and
a scheduler for generating a transmission schedule for packets to be transmitted; and
a hypothetical decoder for performing hypothetical decoding during the transmission according to the transmission schedule comprising
a first hypothetical decoding buffer for buffering the packets to be transmitted according to the transmission schedule; and
an output for outputting packets from the first hypothetical decoding buffer on a transmission frame basis;
a second hypothetical buffer for buffering packets formed on the basis of the output from the first hypothetical decoding buffer; and
a controller for controlling the buffer occupancy level of the first hypothetical decoding buffer by controlling at least one of the following:
the operation of the stream generator;
the generation of at least one transmission frame,
the transmission schedule.

According to a fourth aspect of the present invention there is provided a wireless communication device comprising a buffer for buffering a media stream for transmission from the wireless communication device to a receiving device, the wireless communication device further comprising:
a stream generator comprising
a first packetizer for forming media packets from at least one kind of media information of the media stream;
a frame generator for generating at least one transmission frame on the basis of media packets to be transmitted;
a second packetizer for forming packets to be transmitted from the at least one transmission frame; and
a scheduler for generating a transmission schedule for packets to be transmitted; and
a hypothetical decoder for performing hypothetical decoding during the transmission according to the transmission schedule comprising
a first hypothetical decoding buffer for buffering the packets to be transmitted according to the transmission schedule; and
an output for outputting packets from the first hypothetical decoding buffer on a transmission frame basis;
a second hypothetical buffer for buffering packets formed on the basis of the output from the first hypothetical decoding buffer; and
a controller for controlling the buffer occupancy level of the first hypothetical decoding buffer and the second hypothetical decoding buffer by controlling at least one of the following:
the operation of the stream generator;
the generation of at least one transmission frame;
the transmission schedule.

According to a fifth aspect of the present invention there is provided a server comprising a buffer for buffering a media stream for transmission from the server to a receiving device, the server further comprising:
a stream generator comprising
a first packetizer for forming media packets from at least one kind of media information of the media stream;
a frame generator for generating at least one transmission frame on the basis of media packets to be transmitted;
a second packetizer for forming packets to be transmitted from the at least one transmission frame; and
a scheduler for generating a transmission schedule for packets to be transmitted;
a hypothetical decoder for performing hypothetical decoding during the transmission according to the transmission schedule comprising
a first hypothetical decoding buffer for buffering the packets to be transmitted according to the transmission schedule; and
an output for outputting packets from the first hypothetical decoding buffer on a transmission frame basis;
a second hypothetical buffer for buffering packets formed on the basis of the output from the first hypothetical decoding buffer; and
a controller for controlling the buffer occupancy level of the first hypothetical decoding buffer and the second hypothetical decoding buffer by controlling at least one of the following:
the operation of the stream generator;
the generation of at least one transmission frame;
the transmission schedule;
a transmitter for transmitting the packets to the receiving device.

According to a sixth aspect of the present invention there is provided a Multimedia Broadcast/Multicast Service server comprising a buffer for buffering a media stream for transmission from the server to a receiving device, the server further comprising:
a stream generator comprising
a first packetizer for forming packets from at least one kind of media information of the media stream;
a frame generator for generating at least one transmission frame on the basis of media packets to be transmitted;
a second packetizer for forming packets to be transmitted from the at least one transmission frame; and
a scheduler for generating a transmission schedule for packets to be transmitted;
a hypothetical decoder for performing hypothetical decoding during the transmission according to the transmission schedule comprising
a first hypothetical decoding buffer for buffering the packets to be transmitted according to the transmission schedule; and
an output for outputting packets from the first hypothetical decoding buffer on a transmission frame basis;

a second hypothetical buffer for buffering packets formed on the basis of the output from the first hypothetical decoding buffer; and a controller for controlling the buffer occupancy level of the first hypothetical decoding buffer and the second hypothetical decoding buffer by controlling at least one of the following:

the operation of the stream generator;
the generation of at least one transmission frame;
the transmission schedule;

a transmitter for transmitting the packets as a Multimedia Broadcast/Multicast Service.

According to a seventh aspect of the present invention there is provided a receiving device for receiving packets having a transmission schedule and comprising at least one transmission frame from which transmitted packets have been formed, said at least one transmission frame comprising media packets being formed on the basis of at least one kind of media information of a media stream, the receiving device comprising:

a receiver for receiving the transmitted packets including information of an initial buffering amount for delaying the decoding of the packets at the beginning of reception of the packets;

a first de-packetizer for reconstructing the media packets from the received packets;

a buffer for buffering the information of the media packets;

a decoder for decoding media information of the media packets; and a controller for delaying the decoding according to the information of the initial buffering amount.

According to an eighth aspect of the present invention there is provided a signal associated to a media stream comprising media packets being formed on a basis of at least one kind of media information of the media stream, the media packets included in at least one transmission frame from which packets to be transmitted have been formed and having a transmission schedule, wherein the signal comprises information of such an initial buffering amount for delaying the decoding of the packets at the beginning of reception of the media stream that makes each media packet of the media stream in any transmission frame available at or prior to its decoding time.

According to a ninth aspect of the present invention there is provided a computer program product comprising a computer program which comprises machine executable steps for buffering packets of a media stream by:

forming media packets from at least one kind of media information in a stream generator of a transmitting device;

generating at least one transmission frame on the basis of media packets to be transmitted;

forming packets to be transmitted from the at least one transmission frame;

generating a transmission schedule for packets to be transmitted;

performing a first step of hypothetical decoding according to the transmission schedule comprising machine executable steps for buffering the packets to be transmitted according to the transmission schedule to a first hypothetical decoding buffer; and outputting packets from the first hypothetical decoding buffer on a transmission frame basis;

performing a second step of hypothetical decoding comprising:

buffering packets formed on the basis of the output from the first hypothetical decoding buffer;

controlling the buffer occupancy level of the first hypothetical decoding buffer and the second hypothetical decoding buffer by controlling at least one of the following:

the operation of the stream generator;
the generation of at least one transmission frame;
the transmission schedule.

DESCRIPTION OF THE DRAWINGS

In the following the present invention will be described in more detail with reference to the appended drawings in which.

DETAILED DESCRIPTION OF THE INVENTION

Figure 6:
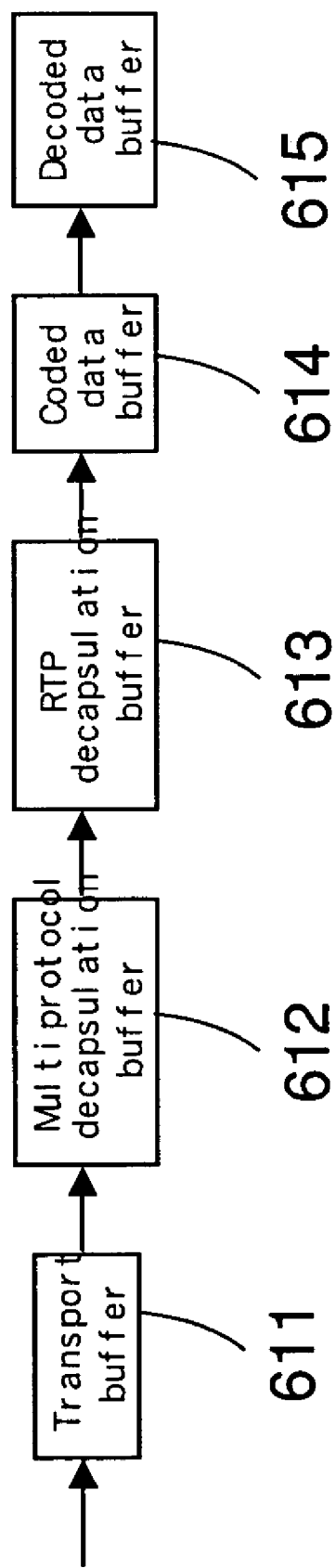
FIG. 6 depicts a buffering model in a system according to an example embodiment of the present invention.
Figure 7:
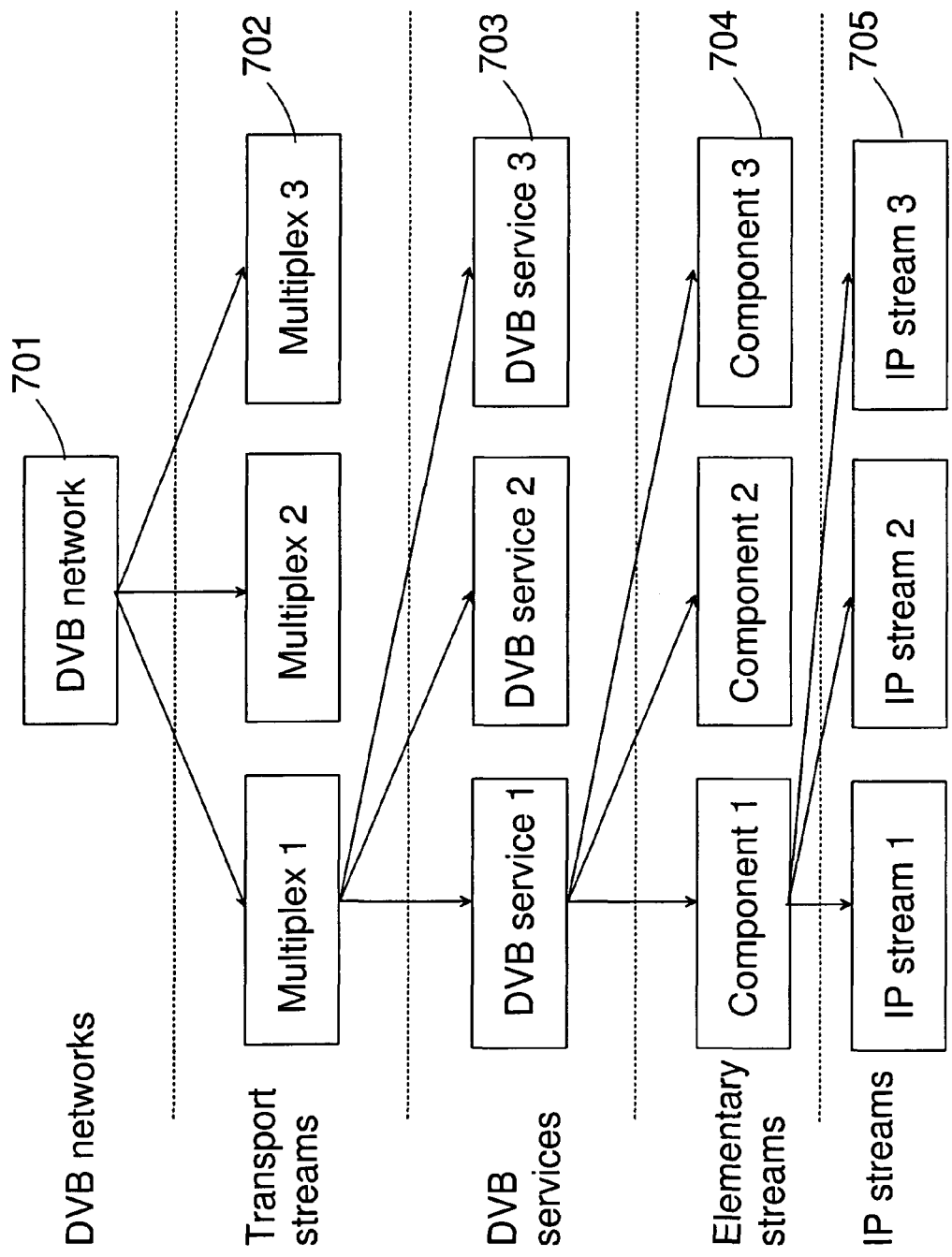
FIG. 7 depicts an example of media transmission in a DVB network.

In the following a system according to an example embodiment of the present invention is described in more detail with reference to FIGS. 1 and 6.

Figure 1:
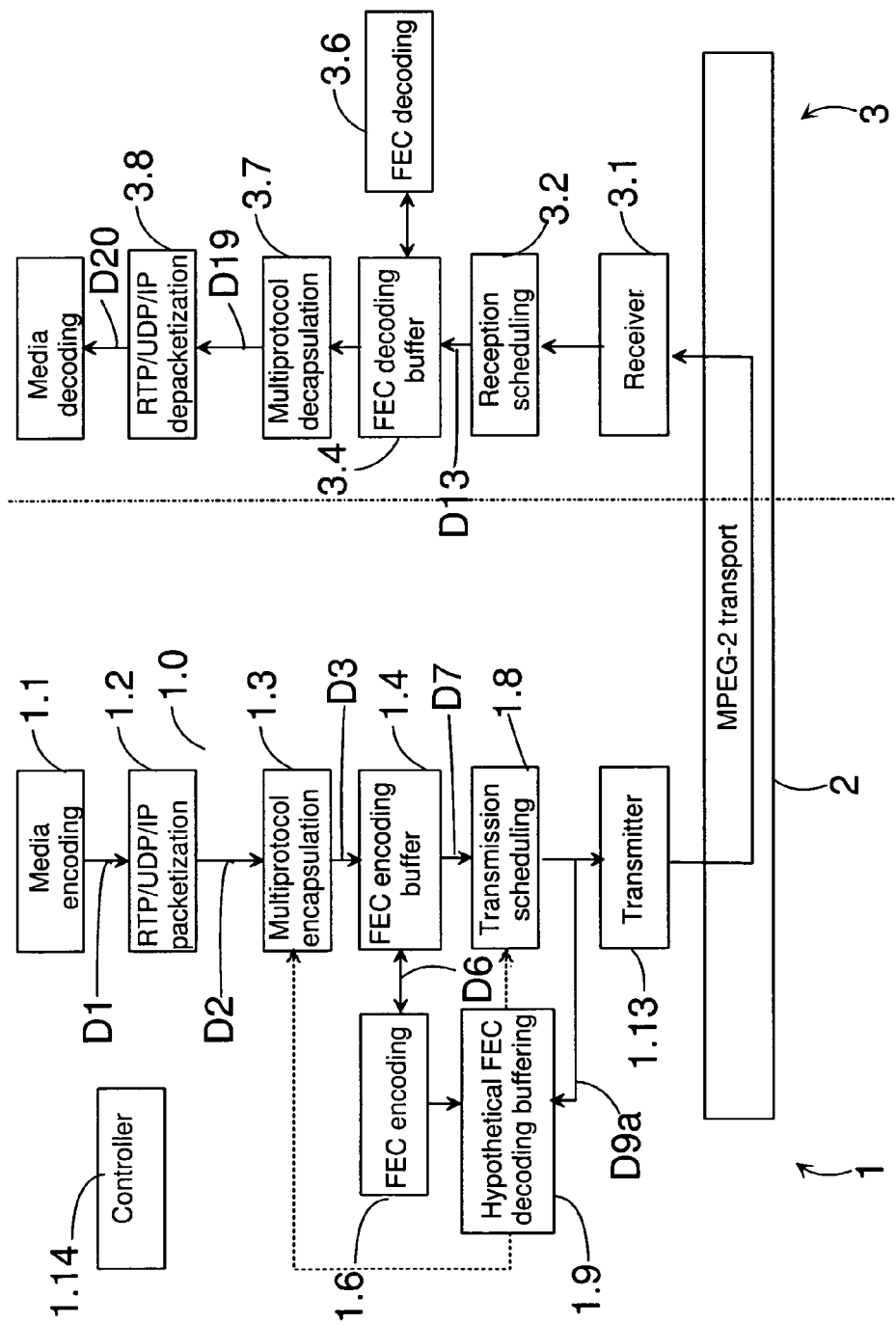
FIG. 1 depicts a system according to an example embodiment of the present invention.
Figure 2:
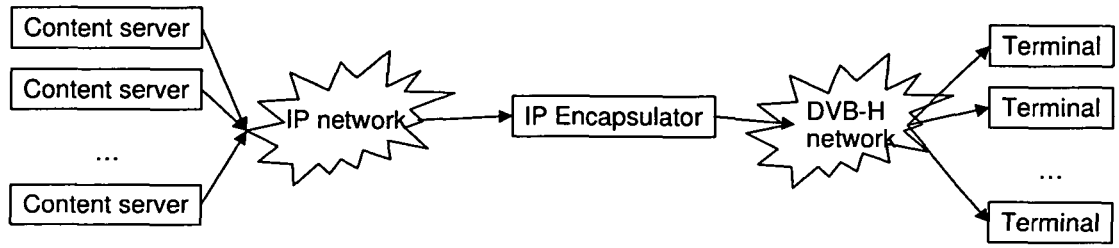
FIG. 2 shows a simplified system for IP datacasting over DVB-H.

The system of FIG. 1 comprises a transmitting device 1, a transmission channel 2 and a receiving device 3. The transmitting device 1 can be e.g. a server, a wireless communication device, a personal computer etc. The receiving device 3 can be e.g. a wireless communication device, a personal computer, a TV etc.

The transmitting device 1 comprises a stream generator 1.0 for forming transport streams 702 from one or more DVB service 703 (containing media components or other IP streams). In this embodiment the stream generator 1.0 comprises an encoder 1.1 for encoding the media information when necessary, an RTP/UDP/IP packetizer 1.2, a multiprotocol encapsulator 1.3, an FEC encoding buffer 1.4, an FEC encoder block 1.6, and a transmission scheduling block 1.8. The encoder 1.1 creates a data flow D1, which contains an encoded bitstream. The data flow D1 is transferred to the packetizer 1.2 in which the data flow D1 is encapsulated into IP datagram payloads R2 according to the payload specification of the format. Next, these source IP datagrams (data flow D2 in FIG. 1) are further processed in the multiprotocol encapsulator block 1.3, which forms a an MPE section by encapsulating the source IP datagram D2 a framed MPE section structure. MPE sections (data flow D3) are stored into the FEC encoding buffer 1.4.

To enable the error recovery of lost transport packets the necessary error recovery information has to be formed. In this embodiment the repair packets are formed in the following way. The FEC encoder block 1.6 calculates the error correction code over these MPE sections and forms MPE-FEC sections for repair packets containing the error correction code for the source IP datagrams D2. The MPE-FEC sections (data flow D6) are stored in the FEC encoding buffer 1.4 as well.

The transmission scheduling block 1.8 decides the pace for transmitting MPE section packets. IP datacasting over DVB-H typically applies time slicing, in which the elementary stream is transmitted in bursts so that the receiver, utilizing control signals, remains inactive when no bursts are to be received. The bursts are sent at a significantly higher bit-rate compared to the bitrate required if the data was transmitted with the bitrate equal to the media decoding bitrate. Significant power consumptions can be achieved thanks to time slicing compared to a receiver in which radio receiver remains constantly active.

The packet scheduler 1.8 controls the outputting of an MPE section packet so that each MPE section packet shall be transmitted at an appropriate moment according to the scheduling process in use. The order in which the MPE section packets can be is, for example, such that all the source MPE section packets of one FEC block are transmitted before the repair packet(s) block is/are transmitted. It is, however, obvious that ordering different from that can be applied. For example, the source MPE section packets and the repair packets can be interleaved.

The packet scheduler 1.8 transmits the MPE section packets as packets of an MPEG-2 Transport Stream (TS). In other words, the MPE section packets are segmented to MPEG-2 transport stream packets. When the necessary transport protocol conversions are performed, the packets can be transmitted to the transmission channel 2 by a transmitter 1.13 of the device 1 which is known as such. The transmission can be wireless or wired transmission or both wired and wireless transmission can be applied in different links of the transmission path. The transmission channel can comprise one or more nodes, base stations etc. through which the packet stream is transmitted. The details of the transmission channel and the transmission method are known as such and it is not necessary to describe them in more detail here.

The packets are not necessarily transmitted after the scheduling process is performed but it is also possible that the packets are stored in a memory, for example as a file. The file may also be included with additional information.

In the system according to the present invention the MPEG-2 transport stream packets are also transferred to a hypothetical decoder 1.9 (data flow D9a). The operation of the hypothetical decoder 1.9 is described in more detail later in this description. The hypothetical FEC decoder may control the pace of transmission scheduling, the number of created repair packets (per each FEC block) and the number of source MPE section packets (IP datagrams) in each FEC block. These control operations are indicated with dashed lines in the FIG. 1.

In the following, the operation of the receiving device 3 is described in more detail. The receiver 3.1 receives the signals which carry the transmitted packet stream and performs the necessary demodulation operations wherein the receiver 3.1 outputs the demodulated information to the reception scheduling block 3.2. The reception scheduling block 3.2 determines when the receiver is turned on to receive desired time slicing bursts. In the reception scheduling block 3.2 the demodulated information is converted to MPE section packet stream. The reception scheduling block 3.2 may perform, when necessary, some protocol conversions and decryption operations, to reconstruct the MPE section packet flow (data flow D13). The reception scheduling block forwards the MPE sections to the FEC decoding buffer 3.4.

If there is at least one missing source packet in an FEC block, the receiving device 3 would try to correct the loss as follows: the FEC decoder 3.6 uses an appropriate FEC decoding algorithm to regenerate lost source MPE sections and stores them back to the FEC decoding buffer 3.4.

The multiprotocol decapsulation block 3.7 fetches MPE section packets from the FEC decoding buffer 3.4. In the multiprotocol decapsulation block 3.7 the an RTP/UDP/IP packet is formed by taking the payload of the MPE section, and, if necessary, reassembling the RTP/UDP/IP packet from several MPE sections. After this operation the RTP/UDP/IP datagram packet flow (data flow D19) complies with the payload specification of the media format and can be transferred to the de-packetizer 3.8.

The de-packetizer 3.8 de-packetizes the RTP/UDP/IP datagram packet flow D19 and separates the payload from the source RTP/UDP/IP datagram packets according to the media payload specification of the media format. This results into a bitstream or a stream of application data units (ADUs, data flow D20). An application data unit is an elementary unit of the media coding format, such as a Network Abstraction Layer (NAL) Unit of the H.264/AVC coding standard or a coded audio frame. Then, the media bitstream or the stream of ADUs can be decoded for further processing.

Hypothetical Decoder

In the following, the operation of the hypothetical FEC decoder 1.9 will be described in more detail. The hypothetical receiver contains the buffers depicted in FIG. 6. Herein, the hypothetical FEC decoder is considered to consist of the transport buffer 611, the multiprotocol decapsulation buffer 612, and the RTP decapsulation buffer 613. The hypothetical media decoder is considerd to consist of the coded data buffer 614 and the decoded data buffer 615.

The transport buffer 611 (FIG. 6) receives MPEG-2 TS packets and removes any duplicate packets. Its operation is similar to what is described in ETSI EN 301 192 and MPEG-2 Systems. The multiprotocol decapsulation buffer 612 is used for virtual FEC decoding and decapsulation of MPE sections to IP datagrams. The RTP decapsulation buffer 613 is used for decapsulation of RTP and RTP payload headers and for smoothing the bursty nature of time slices to constant bitrate input for the media decoders. The coded data buffer 614 and the decoded data buffer 615 are specified in the media decoder specifications.

There is one transport buffer 611 per each MPEG-2 TS multiplex 702, one multiprotocol decapsulation buffer 612 per each elementary stream 704, one RTP decapsulation buffer 613 per each IP stream 705, one coded data buffer 614 per each elementary media stream carried within the IP stream, and typically one decoded data buffer 615 per each elementary media stream carried within the IP stream.

The multiprotocol decapsulation buffer 612 and the RTP decapsulation buffer 613 are described in the following.

The multiprotocol decapsulation (MPD) buffer model is applied to time-sliced elementary streams 704 carrying IP streams 705. The value of the time_slicing element of the time slice and FEC indentifier descriptor may be equal to one for time-sliced elementary streams.

The MPD buffer model is specified as follows. The MPD buffer 612 is initially empty. Data transmission starts from the first MPEG-2 TS packet in transmission order of a time slice. Each MPEG-2 TS packet output from the transport buffer 611 is inserted to the MPD buffer (without the TS packet header). When the value of mpe_fec element of the time slice and FEC indentifier descriptor is equal to 00b, an MPEG-2 TS packet completes an MPE section, and the completed MPE section completes a datagram (i.e., the value of the last section number is equal to the value of the section number in the MPE section header). The MPE section is removed from the MPD buffer 612 and the datagram carried in the MPE section is output. When the value of mpe_fec element of the time slice and FEC indentifier descriptor is equal to 01b and an MPEG-2 TS packet is the first one in a time slice, an MPE-FEC frame is formed in the MPD buffer as specified in clause 9.3.1 of ETSI EN 301 192 v1.4.1. When the value of mpe_fec element of the time slice and FEC indentifier descriptor is equal to 01b, each MPEG-2 TS packet is inserted to the MPE-FEC frame in the MPD buffer 612 as specified in clause 9.3.1 of ETSI EN 301 192 v1.4.1. When the value of mpe_fec element of the time slice and FEC identifier descriptor is equal to 01b and an MPEG-2 TS packet is the last one containing data for the MPE-DEC frame in the MPD buffer 612, then the datagrams carried in the MPE sections of the MPE-FEC frame are output and the MPE-FEC frame is removed from the MPD buffer 612.

RTP Decapsulation Buffer

The RTP decapsulation buffer model is applied to datagrams that are output from the multiprotocol decapsulation buffer 612 and contain RTP packets. The RTP decapsulation buffer model is specific to an IP stream.

The RTP decapsulation buffer 613 is initially empty. Each RTP packet is inserted to the RTP decapsulation buffer 613 without UDP and IP header but including RTP header immediately when it is output from the MPD buffer 612. RTP packets are not removed from the RTP decapsulation buffer 613 before the signaled initial buffering delay (since the insertion of the first RTP packet) has expired. The signaling means for the initial buffering delay are specified later in this application. Application data units (ADUs) are output from the RTP decapsulation buffer 613 in their decoding order. For H.264/AVC streams, an ADU is defined as a NAL unit and their decoding order is specified in RFC 3984. For MC streams, an ADU is identical to an access unit as specified in RFC 3640, and the decoding order of ADUs is also specified in RFC 3640. The first ADU in decoding order is output immediately when the initial buffering delay expires. Each succeeding ADU in decoding order is output when it becomes available in the RTP decapsulation buffer 613 and the following time (in seconds) since the removal of the previous ADU has elapsed:8*(size of the previous ADU in bytes)/(1000* (value of "b=AS" SDP attribute for the stream)). An RTP packet is removed from the RTP decapsulation buffer, when all the ADUs it contains are output.

Signaling of Initial Buffering Delay

The initial buffering delay signals the delay in wall clock time (in units of milliseconds) from the insertion of the RTP packet to the RTP decapsulation buffer 613 until the first ADU in decoding order can be output from the RTP decapsulation buffer 613. The signaled delay guarantees pauseless decoding and playback. The value is an unsigned 16-bit integer in network byte order.

In the following, some details of an example of the syntax and semantics for the initial buffering signaling will be presented.

RTCP Extended Report (XR), specified in RFC 3611, is a mechanism to extend the information carried over RTCP beyond to the contents of the Sender and Receiver Reports. Seven report block types of RTCP XR reports are specified in RFC 3611, and an extension mechanism is provided to include additional report block types. A new RTCP XR report block type may be specified for conveying of the initial buffering delay.

The RTCP Sender Reports should be conveyed in every MPE FEC frame to enable correct audio-video synchronization in receivers that start reception from that MPE FEC frame. The proposed initial buffering delay Extended Report can therefore be aggregated to the same RTCP packet as the Sender Report. Consequently, no UDP/IP/MPE section overhead is required for carriage of the initial buffering information.

Alternatively, The initial buffering delay element may be present in RTP packets as specified below. When the initial buffering delay element is not present in an RTP packet, the previous value of the initial buffering delay is applicable to the RTP packet. If no previous value of the initial buffering delay element is available, the initial buffering delay is inferred to be 0. When the padding bit in the RTP header is equal to 1, the value of the last octet of the padding is greater than 2, and the value of the octet preceding the last octet of the padding is equal to 0×80, the initial buffering delay element is present. The value of initial buffering delay precedes the two last octets of RTP padding.

Alternatively, an additional initial buffering delay field is specified in a descriptor that is multiplexed to the MPEG-2 transport stream.

Alternatively, a new MPE section structure is specified or the existing MPE section or MPE-FEC section structure is appended to include the initial buffering delay element.

Generation of an FEC Block

Figure 3:
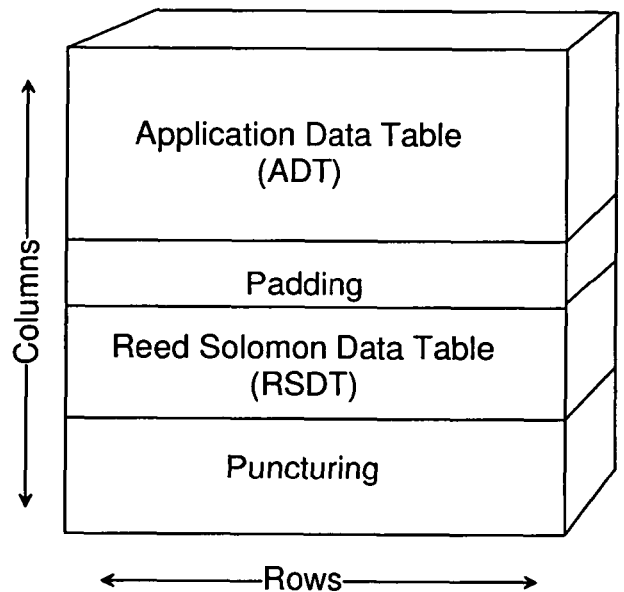
FIG. 3 shows the structure of an MPE-FEC frame.
Figure 4:
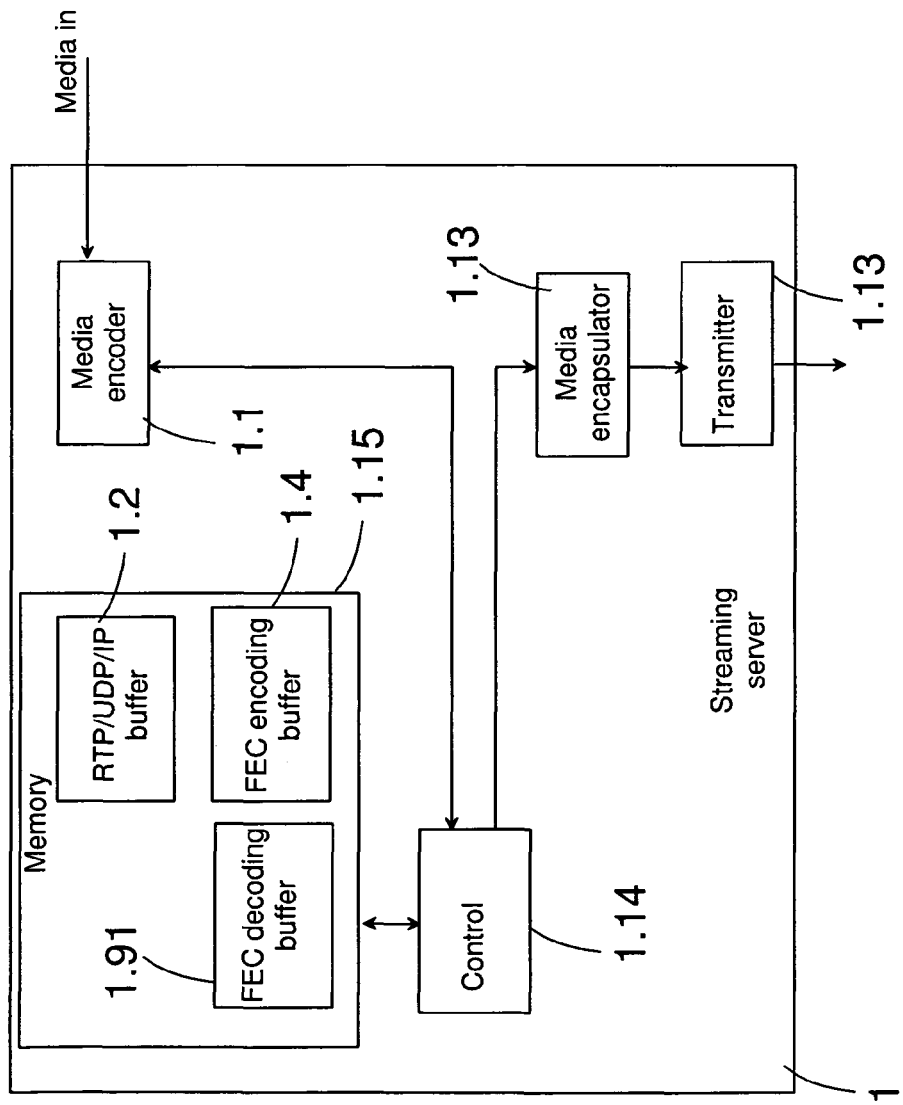
FIG. 4 shows a transmitting device according to an example embodiment of the present invention as a simplified block diagram.

An MPE-FEC frame is arranged as a matrix with 255 columns and a flexible number of rows. Currently row sizes of 256, 512, 768, 1024 bytes are defined. FIG. 3 shows the structure of an MPE-FEC frame. Each position in the matrix hosts an information byte. The first 191 columns are dedicated to MPE sections carrying IP datagrams and possible padding. This part of the MPE-FEC frame is called the application data table (ADT). The next 64 columns of the MPE-FEC frame are reserved for the Reed-Solomon (RS) FEC coded parity information, and called the RS data table (RSDT).

Figure 5:
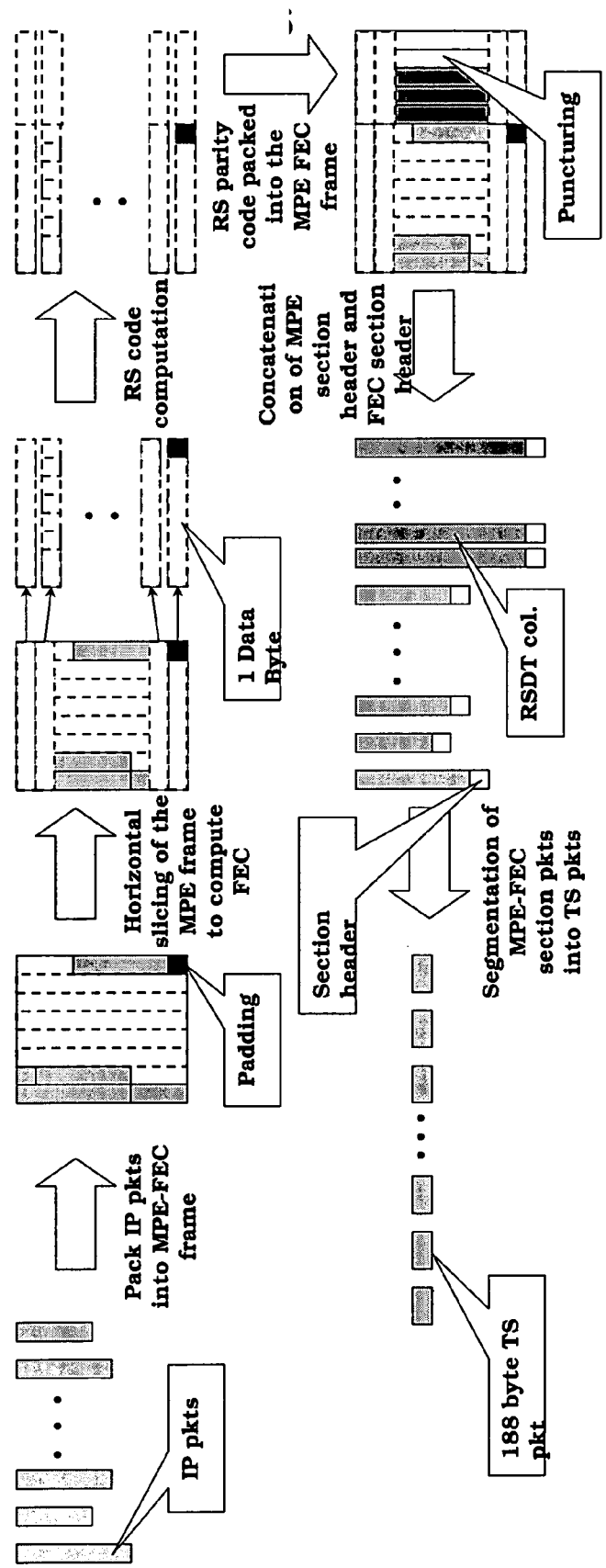
FIG. 5 illustrates the procedure to compute the RSDT.

The ADT can be completely or partially filled with datagrams. The remaining columns, when the ADT is partially filled, are padded with zero bytes and are called padding columns. Padding is also done when there is no more space left in the MPE-FEC frame to fill the next complete datagram. The RSDT is computed across each row of the ADT using RS (255, 191) FEC code. FIG. 5 illustrates the procedure to compute the RSDT.

It is not necessary to compute the entire 64 columns of the RSDT and some of its right-most columns could be completely discarded and this procedure is termed puncturing. The padded and punctured columns are not sent over the transmission channel.

Conformance Requirements

The transmitting device 1, such as an IP encapsulator, shall verify that the buffer occupancy level in the hypothetical FEC decoder 1.9 shall not exceed the required buffer size. If necessary, the hypothetical FEC decoder 1.9 may control the stream generator 1.0 to change some parameters to affect the buffer occupancy level. For example, the hypothetical FEC decoder 1.9 may control the frequency and/or number of formed media packets, the frequency and number of formed repair packets, and/or the transmission schedule of media and repair packets. Furthermore, the transmitting device 1 should be implemented so that the output of the hypothetical FEC decoder 1.9 complies with the media payload and decoding specifications of the media format.

In some implementations the size of the decoding buffer may not be constant but it can be changed according to the need. The hypothetical FEC decoder 1.9 may determine the necessary buffering size for the FEC decoding buffer. The determined size can then be indicated to the receiving device 3 which can reserve enough memory for the buffering.

The hypothetical decoder 1.9 can comprise a controller (not shown) for performing the above described operations, or the controller 1.14 of the transmitting device may be used as the controller of the hypothetical decoder 1.9.

When the presented buffering model containing the multiprotocol decapsulation buffer and the RTP decapsulation buffer is applied, the transmitting device shall verify that any time-sliced elementary stream carrying IP streams conforms to the buffering presented model and the following requirements:

For any elementary stream, the buffer occupancy level of the multiprotocol decapsulation buffer 612 shall not exceed a value of a first parameter (A) indicative of a first number of bytes.

For any IP stream carried in the elementary stream, the output of the RTP decapsulation buffer shall conform to decoding specification of the media format.

For any IP stream carried in the elementary stream, the buffer occupancy level of the RTP decapsulation buffer 613 shall not exceed a value of a second parameter (B) indicative of a second number of bytes.

The values of the first A and the second parameter B are proportional to the maximum MPE-FEC frame size. Certain marginal to smooth out variations in bitrate and time-slice interval should be taken into account when determining the value of the second parameter B.

The receiving device 3, such as a DVB-H client, shall be capable of receiving an MPEG-2 transport stream that complies with the hypothetical FEC decoder 1.9. Furthermore, when the receiving device 3 complies with the requirements for the media decoding of the MPEG-2 transport packet stream, it shall be able to de-packetize and decode the MPEG-2 transport packet stream and output decoded data at the correct rate.

What is claimed is:

1. A method comprising:
    forming media packets from at least one kind of media information in a stream generator;
    generating a transmission schedule for said media packets to be transmitted in transmission frames;
    performing a first hypothetical decoding according to the transmission schedule comprising:
        buffering said media packets according to the transmission schedule to a first hypothetical decoding buffer for decapsulation of multiprotocol encapsulation frames carrying error correction data from the media packets and for virtual forward error correction decoding the multiprotocol encapsulation frames carrying error correction data to form datagrams; and
        outputting datagrams from the first hypothetical decoding buffer on the transmission frame basis;
    performing a second hypothetical decoding comprising:
        buffering datagrams output from the first hypothetical decoding buffer to a second hypothetical decoding buffer for decapsulation of real time protocol packets from the datagrams and smoothing out data rate variations caused by bursty output of the virtual forward error correction decoding;
    controlling the buffer occupancy level of the first hypothetical decoding buffer to ensure that the buffer occupancy level of the first hypothetical decoding buffer shall not exceed a first value; and
    controlling the buffer occupancy level of the second hypothetical decoding buffer to ensure that the buffer occupancy level of the second hypothetical decoding buffer shall not exceed a second value.

2. The method according to claim 1 wherein forming media transmission packets further comprising
    forming forward error correction data;
    forming one or more repair packets on the basis of the forward error correction data;
    including at least one of the repair packets into the transmission frames.

3. The method according to claim 2 wherein the sizes of the first and second hypothetical decoding buffers are predetermined, wherein controlling the buffer occupancy levels of the first and second hypothetical decoding buffers comprises controlling at least one of the following:
    the frequency of formed media packets,
    the number of formed repair packets, and
    the transmission schedule of media and repair packets.

4. The method according to claim 1 comprising:
    defining an initial buffering amount for delaying the second hypothetical decoding after a first datagram is input to the second hypothetical decoding buffer.

5. The method according to claim 4 wherein the second hypothetical decoding further comprises:
    removing one elementary media unit from the second hypothetical decoding buffer when the initial buffering delay of the hypothetical decoding expires.

6. The method according to claim 1 comprising controlling at least one of the following:
    the operation of the stream generator;
    the generation of at least one transmission frame;
    the transmission schedule.

7. An apparatus comprising:
    a buffer configured to buffer a media stream for transmission;
    a stream generating processor configured to form media packets from at least one kind of media information of the media stream to be transmitted in transmission frames;
    a hypothetical decoder configured to perform hypothetical decoding according to a transmission schedule, comprising:
        a first hypothetical decoding buffer configured to buffer the media packets to be transmitted according to the transmission schedule,
        decapsulate multiprotocol encapsulation frames carrying error correction data from the media packets, and
        perform virtual forward error correction decoding on the multiprotocol encapsulation frames carrying error correction data to form datagrams;
    an output configured to output datagrams from the first hypothetical decoding buffer on the transmission frame basis;
    a second hypothetical buffer configured to
        buffer datagrams formed on the basis of the output from the first hypothetical decoding buffer,
        decapsulate real time protocol packets from the datagrams, and
        smooth out data rate variations caused by bursty output of the virtual forward error correction decoding buffer;
    a controller configured to control the buffer occupancy level of the first hypothetical decoding buffer to ensure that the buffer occupancy level of the first hypothetical decoding buffer shall not exceed a first value and to control the buffer occupancy level of the second hypothetical decoding buffer to ensure that the buffer occupancy level of the second hypothetical decoding buffer shall not exceed a second value, and
    a transmitter configured to transmit packets.

8. The apparatus according to claim 7 further comprising:
    a forward error correction encoder configured to:
        form forward error correction data on the basis of the media packets; and form one or more repair packets on the basis of the forward error correction data; and a packet scheduler configured to include at least one of the repair packets into transmission frames.

9. The apparatus according to claim 8 wherein the sizes of the first and second hypothetical decoding buffers are predetermined, and wherein the controller is configured to control the buffer occupancy level of the first and second hypothetical decoding buffers by controlling at least one of the following:

the frequency of formed media packets,
the number of formed repair packets, and
the transmission schedule of media and repair packets.

10. The apparatus according to claim 7 wherein the controller is configured to define an initial buffering amount for delaying the second hypothetical decoding after a first datagram is input to the second hypothetical decoding buffer.

11. The apparatus according to claim 10 wherein the hypothetical decoder is configured to:

remove one elementary media unit from the second hypothetical decoding buffer when the initial buffering delay for buffering datagrams in the second hypothetical decoding buffer expires.

12. The apparatus according to claim 7, wherein said controller is configured to control the buffer occupancy level of the first and second hypothetical decoding buffers by controlling at least one of the following:

the operation of the stream generator;
the generation of at least one transmission frame;
the transmission schedule.

13. The apparatus according to claim 7, said stream generating processor comprising a first packetizer configured to form media packets from at least one kind of media information of the media stream;

a frame generator configured to generate at least one transmission frame on the basis of media packets to be transmitted;

a second packetizer configured to form packets to be transmitted from the at least one transmission frame; and a scheduler configured to generate a transmission schedule for packets to be transmitted.

14. A Multimedia Broadcast/Multicast Service server comprising:

a buffer configured to buffer a media stream for transmission;

a stream generating processor configured to:
form media packets from at least one kind of media information of the media stream to be transmitted in transmission frames;

a hypothetical decoder configured to perform hypothetical decoding according to a transmission schedule, comprising:

a first hypothetical decoding buffer configured to
buffer the media packets to be transmitted according to the transmission schedule;
decapsulate multiprotocol encapsulation frames carrying error correction data from the media packets, and
perform virtual forward error correction decoding the multiprotocol encapsulation frames carrying error correction data to form datagrams;

an output configured to output datagrams from the first hypothetical decoding buffer on the transmission frame basis;

a second hypothetical decoding buffer configured to buffer datagrams formed on the basis of the output from the first hypothetical decoding buffer,
decapsulate real time protocol packets from the datagrams; and
smooth out data rate variations caused by bursty output of the virtual forward error correction decoding; and a transmitter configured to transmit the packets as a Multimedia Broadcast/Multicast Service;

wherein said server is configured to control the buffer occupancy level of the first hypothetical decoding buffer to ensure that the buffer occupancy level of the first hypothetical buffer shall not exceed a first value and to control the buffer occupancy level of the second hypothetical decoding buffer to ensure that the buffer occupancy level of the second hypothetical decoding buffer shall not exceed a second value.

15. A device comprising:
means for buffering a media stream for transmission;
means for forming media packets from at least one kind of media information of the media stream to be transmitted in transmission frames;

a hypothetical decoder configured to perform hypothetical decoding according to a transmission schedule, comprising:

means for buffering the media packets to a first hypothetical decoding buffer for decapsulation of multiprotocol encapsulation frames carrying error correction data from the media packets, and for virtual forward error correction decoding the multiprotocol encapsulation frames carrying error correction data to form datagrams; and means for outputting datagrams from the first hypothetical decoding buffer on a transmission frame basis;

means for buffering datagrams output from the first hypothetical decoding buffer to a second hypothetical buffer for decapsulation of real time protocol packets from the datagrams and smoothing out data rate variations caused by bursty output of the virtual forward error correction decoding;

means for controlling the buffer occupancy level of the first hypothetical decoding buffer to ensure that the buffer occupancy level of the first hypothetical decoding buffer shall not exceed a first value and to control the buffer occupancy level of the second hypothetical decoding buffer to ensure that the buffer occupancy level of the second hypothetical decoding buffer shall not exceed a second value, and means for transmitting packets.

16. The apparatus according to claim 15 wherein the device further comprises:

a forward error correction encoder configured to:
form forward error correction data on the basis of the media packets; and
form one or more repair packets on the basis of the forward error correction data; and a packet scheduler configured for including at least one of the repair packets into transmission frames.

17. The device according to claim 15, further comprising means for controlling at least one of the following:

the operation of said means for buffering a media stream for transmission;
the generation of at least one transmission frame;
the transmission schedule.

* * * * *